(12) United States Patent
Kameshima

(10) Patent No.: US 8,363,235 B2
(45) Date of Patent: Jan. 29, 2013

(54) DOCUMENT PROCESSING APPARATUS, DOCUMENT PROCESSING METHOD, COMPUTER-READABLE MEDIUM AND COMPUTER DATA SIGNAL

(75) Inventor: Tokuya Kameshima, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1118 days.

(21) Appl. No.: 12/265,475

(22) Filed: Nov. 5, 2008

(65) Prior Publication Data

US 2009/0251722 A1 Oct. 8, 2009

(30) Foreign Application Priority Data

Apr. 4, 2008 (JP) ................................. 2008-098797

(51) Int. Cl.
*G06F 3/12* (2006.01)
(52) U.S. Cl. ...................... 358/1.13; 358/1.14; 358/1.15; 358/1.1; 358/1.12; 270/58.07; 270/58.08; 382/276; 382/298; 399/408
(58) Field of Classification Search ................ 358/1.13, 358/1.14, 1.15, 1.1, 1.12, 1.18; 270/58.07, 270/58.08; 382/276, 298; 399/408
See application file for complete search history.

(56) References Cited

U.S. PATENT DOCUMENTS

| | | | |
|---|---|---|---|
| 6,825,949 B1 * | 11/2004 | Hirai ............................ | 358/1.18 |
| 2003/0007181 A1 | 1/2003 | Nishikawa et al. | |
| 2003/0084406 A1 * | 5/2003 | Baron et al. .................. | 715/517 |
| 2006/0158706 A1 * | 7/2006 | Mori et al. ..................... | 358/540 |
| 2010/0067040 A1 * | 3/2010 | Kameshima ................. | 358/1.15 |

FOREIGN PATENT DOCUMENTS

| | | |
|---|---|---|
| JP | 2003-15844 A | 1/2003 |
| JP | 2004-302646 A | 10/2004 |
| JP | 2004302646 A  * | 10/2004 |

OTHER PUBLICATIONS

Japanese Office Action issued in Application No. 2008/098797, dated Apr. 13, 2010.

* cited by examiner

*Primary Examiner* — Jacky X Zheng
(74) *Attorney, Agent, or Firm* — Sughrue Mion, PLLC

(57) ABSTRACT

A document processing apparatus includes an acquisition unit, a detection unit, a specifying unit and an output unit. The acquisition unit acquires document data containing pieces of page image data corresponding to pages of documents. Each document is formed by stacking and half-folding sheets. The detection unit detects pieces of page image data corresponding to pages to be printed on a same side of a same sheet in the documents, from the page image data contained in the document data. The specifying unit specifies pieces of page image data corresponding to respective pages of each document, from the page image data contained in the document data based on a detection result. The output unit outputs data, which is based on pieces of page image data corresponding to respective pages of at least one of the documents, based on a specifying result.

11 Claims, 18 Drawing Sheets

FIG. 12

| Page image data of output document data | Page of individual document | Printed side of sheet |
|---|---|---|
| 1 | 1st page of document A | Outer side of 1st sheet |
| 2 | 2nd page of document A | Inner side of 1st sheet |
| 3 | 3rd page of document A | Outer side of 2nd sheet |
| 4 | 4th page of document A | Inner side of 2nd sheet |
| ... | ... | ... |
| 9 | 9th page of document A | Outer side of 5th sheet |
| 10 | 10th page of document A | Inner side of 5th sheet |
| 11 | 1st page of document B | Outer side of 6th sheet |
| 12 | 2nd page of document B | Inner side of 6th sheet |
| ... | ... | ... |
| 15 | 5th page of document B | Outer side of 8th sheet |
| 16 | 6th page of document B | Inner side of 8th sheet |
| 17 | 7th page of document B | Inner side of 8th sheet |
| 18 | 8th page of document B | Outer side of 8th sheet |
| ... | ... | ... |
| 21 | 11th page of document B | Inner side of 6th sheet |
| 22 | 12th page of document B | Outer side of 6th sheet |
| 23 | 11th page of document A | Inner side of 5th sheet |
| 24 | 12th page of document A | Outer side of 5th sheet |
| ... | ... | ... |
| 29 | 17th page of document A | Inner side of 2nd sheet |
| 30 | 18th page of document A | Outer side of 2nd sheet |
| 31 | 19th page of document A | Inner side of 1st sheet |
| 32 | 20th page of document A | Outer side of 1st sheet |

DOCUMENT PROCESSING APPARATUS, DOCUMENT PROCESSING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2008-98797 filed Apr. 4, 2008.

BACKGROUND

1. Technical Field

The invention relates to a document processing apparatus, a document processing method, a computer-readable medium and a computer data signal.

2. Related Art

A service for distributing, via a network, document data containing page image data of a document that is formed by stacking and half-folding sheets of paper (e.g., newspaper) is available. A user who receives the document data can read the document on a terminal screen and can print the document by a printer.

As one of ways to improve added value, the following service may be provided. That is, page image data of two or more documents are brought together into one document data, and the document data is distributed. In this case, for example, to output each document, it is necessary for a user to read the page image data contained in the document data and specify page image data corresponding to each document. If the user is a printer and provides a service for delivering a printed document for each document, further time and further effort to specify the page image data would be involved. Thus, to realize the service for distributing the document data as described above, it is necessary to decrease the time and effort for user to specify the page image data of each document.

SUMMARY

According to an aspect of the invention, a document processing apparatus includes an acquisition unit, a detection unit, a specifying unit and an output unit. The acquisition unit acquires document data containing plural pieces of page image data corresponding to respective pages of a plurality of documents. Each document is formed by stacking and half-folding sheets. The detection unit detects pieces of page image data corresponding to pages to be printed on a same side of a same sheet in the documents, from the plural pieces of page image data contained in the document data. The specifying unit specifies pieces of page image data corresponding to respective pages of each document, from the plural pieces of page image data contained in the document data based on a detection result of the detection unit. The output unit outputs data, which is based on pieces of page image data corresponding to respective pages of at least one of the documents, based on a specifying result of the specifying unit.

BRIEF DESCRIPTION OF THE DRAWINGS

Exemplary embodiments of the invention will be described in detail based on the following figures, wherein:

FIG. 12 shows an example of an order of page image data of output document data and sides of sheets on which the page image data are printed, respectively;

DETAILED DESCRIPTION

Referring to the accompanying drawings, exemplary embodiments of the invention will be described in detail below.

First Exemplary Embodiment

Figure 1:
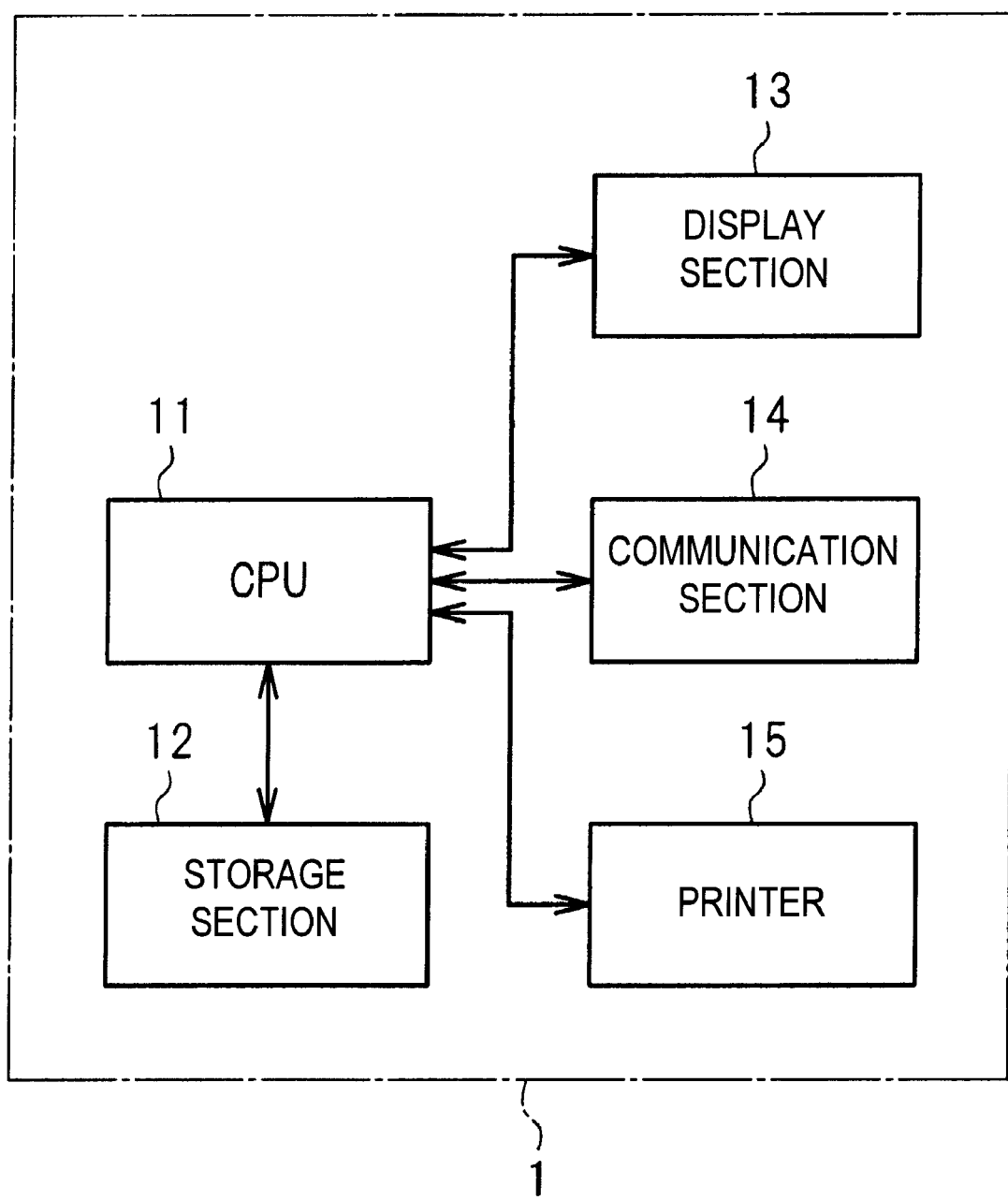
FIG. 1 is a configuration block diagram to show a configuration example of a document processing apparatus according to an exemplary embodiment of the invention.

FIG. 1 is a configuration block diagram to show a configuration example of a document processing apparatus according to an exemplary embodiment of the invention. As shown in the figure, the document processing apparatus 1 includes a CPU 11, a storage section 12, a display section 13, a communication section 14, and a printer 15. The document processing apparatus 1 is implemented by a personal computer, a monitor, and a printer, for example.

The CPU 11 operates in accordance with a program stored in the storage section 12. The program may be provided in a form that it is stored in an information recording medium such as a CD-ROM or a DVD-ROM, or may be provided through a network of the Internet or the like.

The storage section 12 includes memory elements such as RAM and ROM, a hard disk drive, and the like. The storage section 12 stores the program. The storage section 12 also stores information and computation result which are input from respective sections.

The display section 13 is implemented by a display output device such as a monitor or the like. The display section 13 displays (outputs) image data and the like on the monitor under the control of the CPU 11.

The communication section 14 is implemented by a communication device that establishes communication connection with any other apparatus or system. The communication section 14 inputs information, which is received from any other apparatus or system, into the CPU 11 and the storage section 12, and transmits (outputs) information to any other apparatus or system under the control of the CPU 11.

The printer 15 is implemented by a print device that forms an image on a sheet of paper or the like (a recording medium). The printer 15 prints (outputs) image data and the like, for example, on a sheet of paper under the control of the CPU 11.

Figure 2:
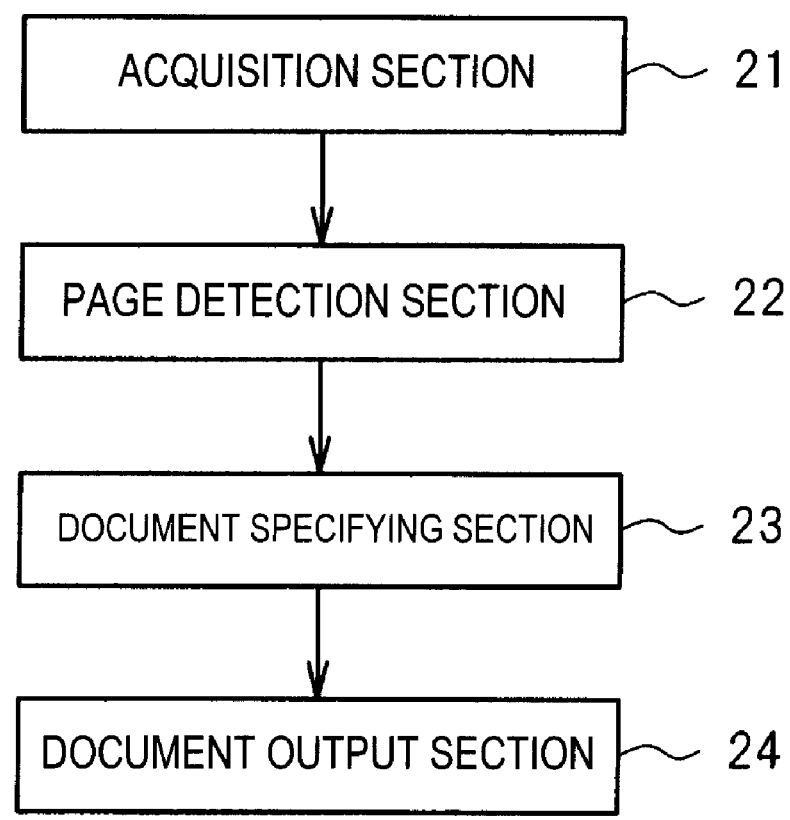
FIG. 2 shows functional blocks of the document processing apparatus according to the exemplary embodiment of the invention.

FIG. 2 is a functional block diagram showing functions provided by the document processing apparatus 1. The document processing apparatus 1 functionally includes an acquisition section 21, a page detection section 22, a document specifying section 23, and a document output section 24. When the CPU 11 executes the program stored in the storage section 12 and controls the display section 13, the communication section 14, and the printer 15, these functions are provided.

Figure 3:
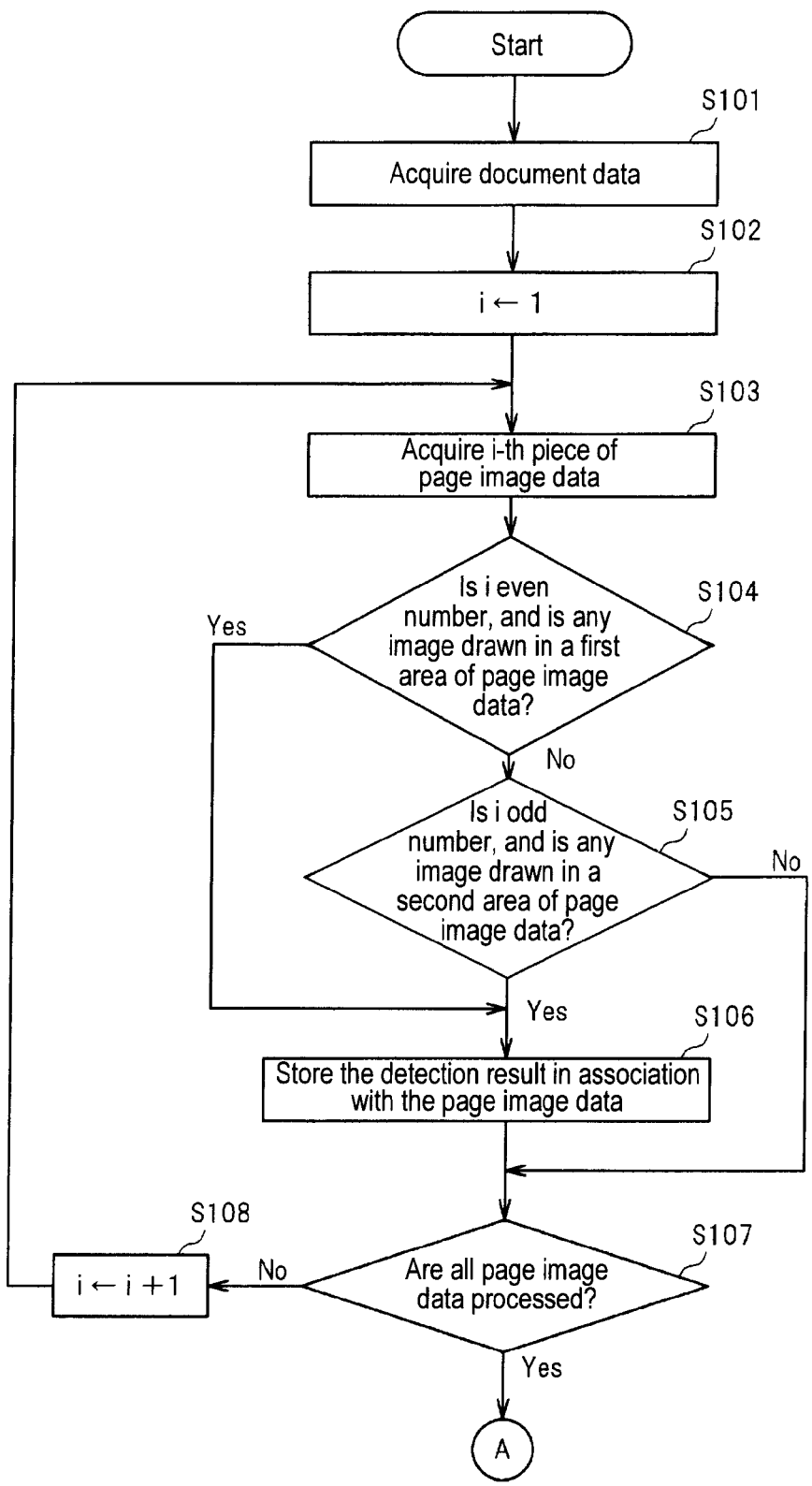
FIG. 3 is a flowchart showing an example of a process flow of the document processing apparatus according to a first exemplary embodiment of the invention.
Figure 4A:
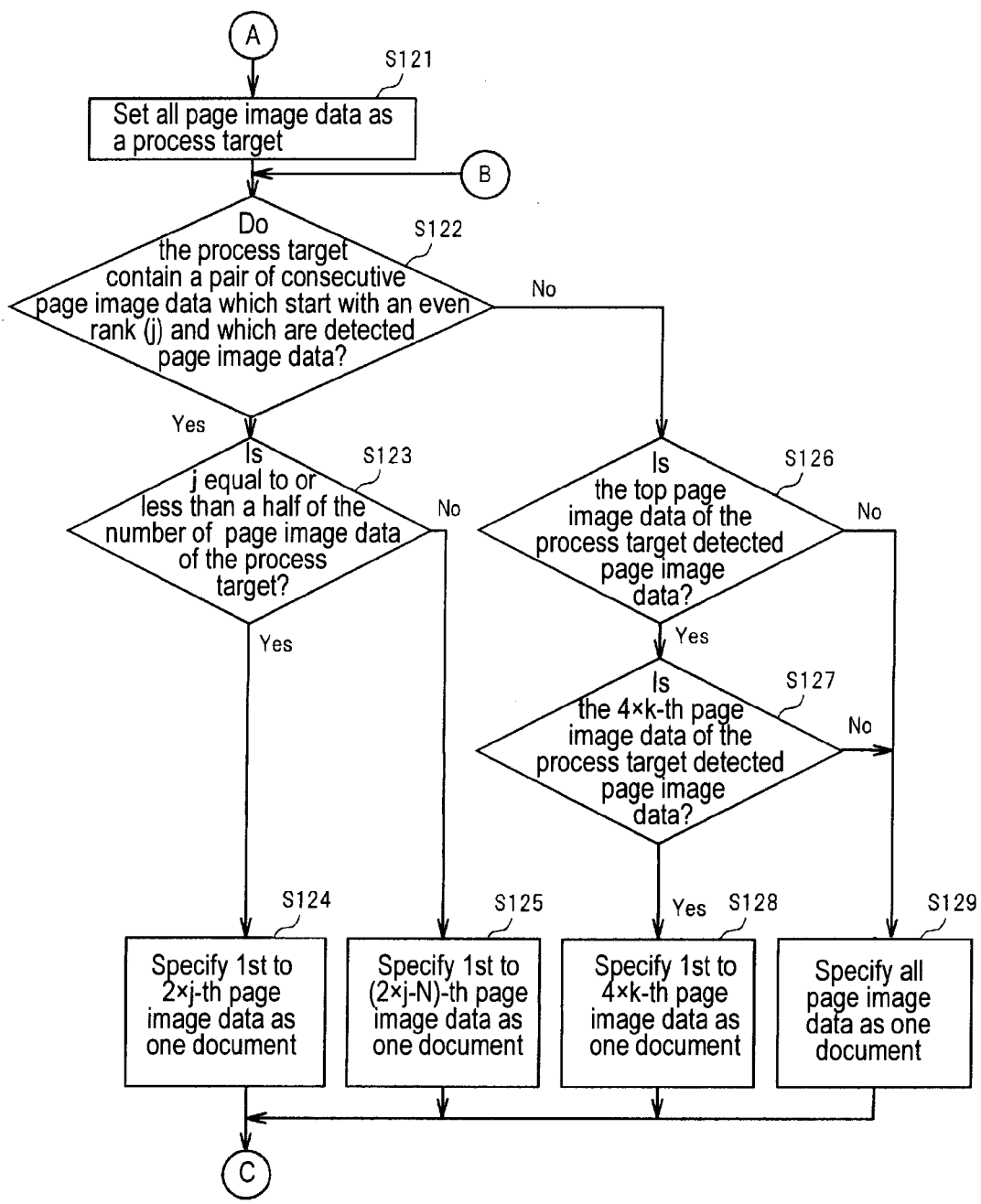
FIGS. 4A and 4B are flowcharts showing the example of the process flow of the document processing apparatus according to the first exemplary embodiment of the invention.
Figure 4B:
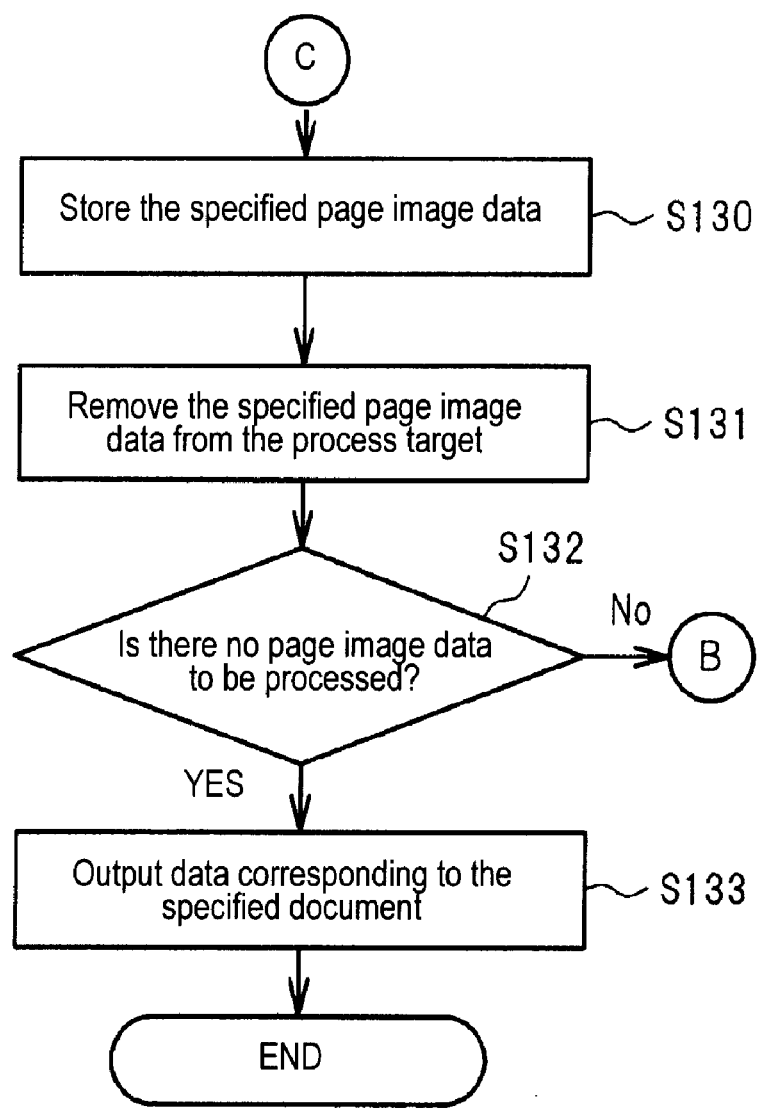

FIGS. 3 and 4 are flowcharts showing an example of a process flow of the document processing apparatus 1 according to a first exemplary embodiment of the invention. The operation of the respective functional blocks will be described with reference to FIGS. 3 and 4.

The acquisition section 21 is implemented mainly by the CPU 11, the storage section 12, and the communication section 14. The acquisition section 21 acquires document data (S101). For example, the acquisition section 21 reads document data from the storage section 12. Alternatively, for example, the acquisition section 21 may acquire document data by receiving the document data transmitted from any other apparatus or system through the communication section 14.

The document data will be described. The document data is data containing pieces of page image data corresponding to respective pages of plural documents. Each document (which will be hereinafter referred to as "individual document") is a document formed by stacking and half-folding sheets. For example, it is a newspaper or a magazine saddle-stitched in a fold portion using a stapler.

Figure 5:
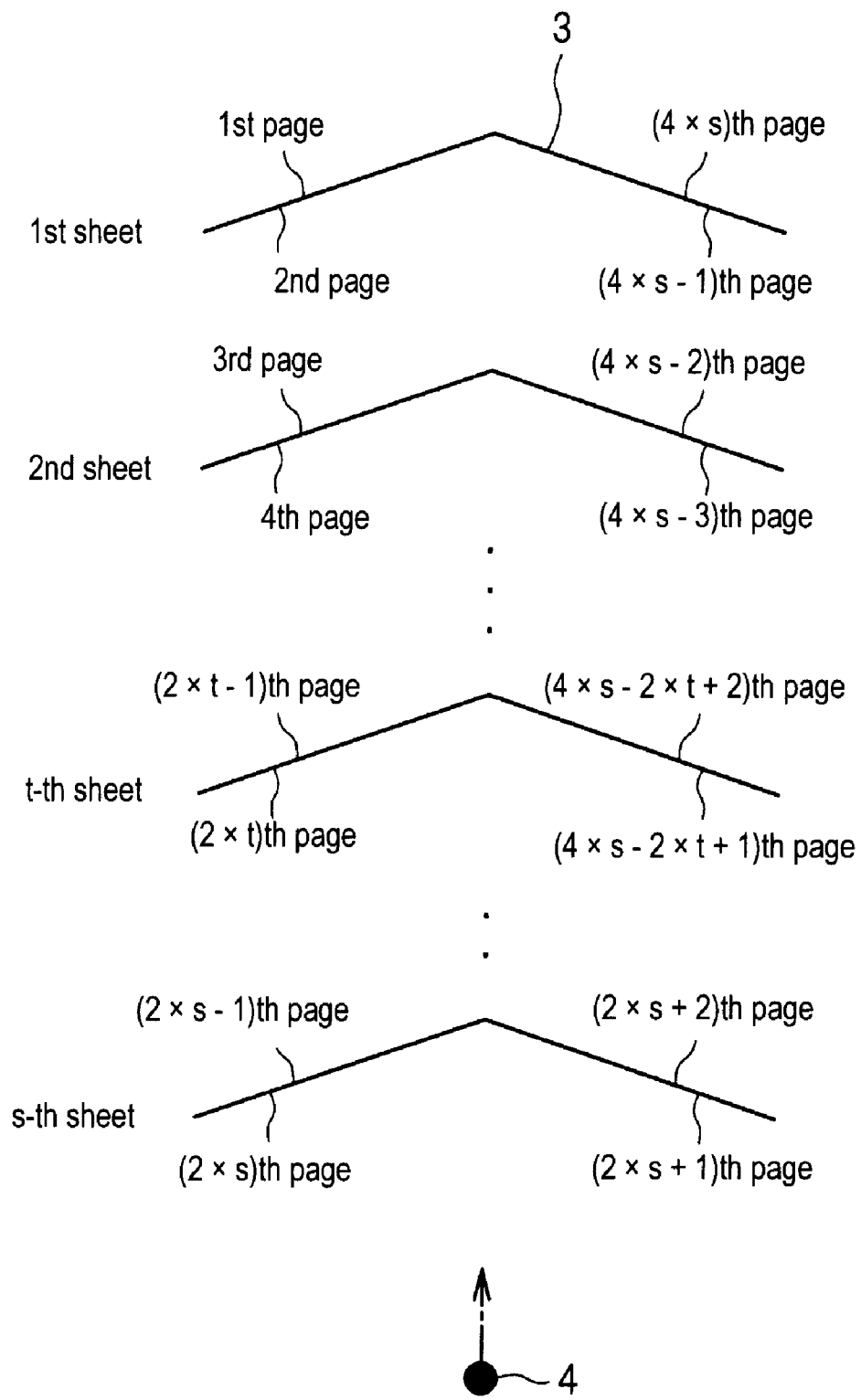
FIG. 5 shows an example of a document which is formed by stacking and half-folding sheets.

FIG. 5 shows an example of a document which is formed by stacking and half-folding sheets (for example, sheets of paper). In the example of FIG. 5, a right-side bound document formed by stacking and half-folding sheets 3 is viewed from the above. As a general rule, an eye point 4 in reading a document is located so as to face the inner side of the folded sheets. In the drawing, for the convenience of description, the sheets are drawn as being separated with spacing therebetween. However, the spacing between the sheets is small in an actual document. Each sheet contains two sides of an inner side and an outer side when each sheet is folded. Two pages are printed on one side of each sheet. Therefore, the number of pages of the document is equal to a value obtained by multiplying the number of sheets by four.

A relationship between pages of a document and the sheets 3 will be described below. Assuming that the number of sheets be s (where s is an integer of one or more), the number of the pages of the document is equal to (4×s) pages. Images indicating contents of first page and (4×s)-th page of the document are printed on the outer side of the first sheet, and images showing contents second page and (4s−1)-th page of the document are printed on the inner side of the first sheet. Likewise, images showing contents of (2×t−1)-th page and (4×s−2×t+2)-th page of the document are printed on the outer side of the t-th sheet (where t is an integer of one or more and s or less), and images showing contents of (2×t)-th page and (4×2−2×t+1)-th page of the document are printed on the inner side of the t-th sheet.

FIG. 5 shows the page order when the opening direction of the document is left. When the opening direction of the document is right, the page order becomes opposite to the page order for the case where the opening direction of the document is left.

Figure 6:
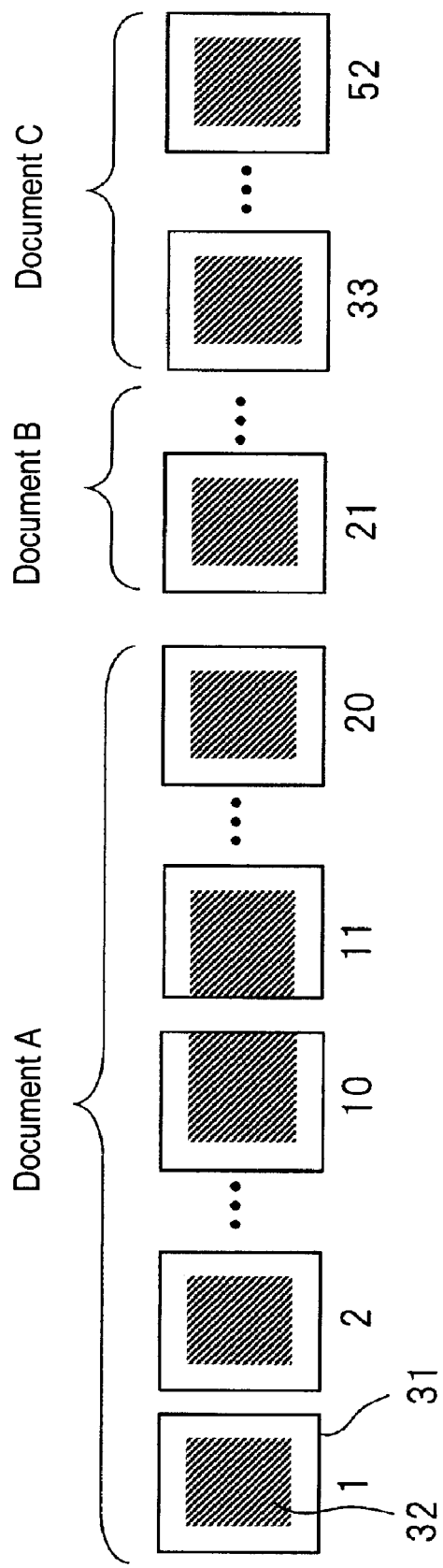
FIG. 6 shows an example of contents of document data containing page image data of plural documents, according to the first exemplary embodiment of the invention.

FIG. 6 shows an example of contents of document data. This document data contains page image data 31 of plural documents (documents A, B, and C). Also, the document data is configured so that the pieces of page image data 31 of the documents A, B, and C can bee read out in order. In the example shown in FIG. 6, the first to 20th page image data 31 of the document data correspond to the first to 20th pages of the document A, respectively. The 21st to 32nd page image data 31 of the document data correspond to first to 12th pages of the document B, respectively. Further, the 33rd to 52nd page image data 31 of the document data correspond to the first to 20th pages of the document C, respectively. Thus, in this exemplary embodiment, the pages of the individual documents and the pieces of page image data 31 are provided in a one-to-one correspondence manner. The page image data of the documents A, B, and C can be read according to (i) the order of the documents A, B, and C and (ii) the original page order of each document. The document data does not contain information indicating separation between the individual documents.

Drawing areas 32 hatched in FIG. 6 are areas where some images are drawn. Text, a photo and/or a figure is drawn in the drawing area 32. In the document A shown in FIG. 6, an image across two pages at the center thereof (pages 10 and 11) is drawn (for example, double spread image). Usually, an area having a predetermined width from an end of each page is set to a margin area. However, an image is drawn in the vicinity of the right end of page 10 of the document A and in the vicinity of the left end of page 11.

The page detection section 22 is implemented mainly by the CPU 11 and the storage section 12. The page detection section 22 detects pieces of page image data corresponding to pages to be printed on a same side of a same sheet in an individual document from the plural pieces of page image data contained in the document data acquired by the acquisition section 21. In this exemplary embodiment, in order to detect the pieces of page image data 31 corresponding to the pages to be printed on the same side of the same sheet, whether or not an image is drawn in a specific area of the page image indicated by each of the page image data 31 contained in the document data is used as a detection criterion.

The specific operation of the page detection section 22 will be described based on the process flow shown in FIGS. 3 and 4. The page detection section 22 first sets a counter "i" indicating a rank of the page image data 31 to 1 (S102). The page detection section 22 acquires the i-th piece of page image data 31 from the document data (S103). The page detection section 22 (for example, a first detection unit) determines as to whether or not an image is drawn in a first area of a page image indicated by the i-th piece of page image data 31.

Figure 7:
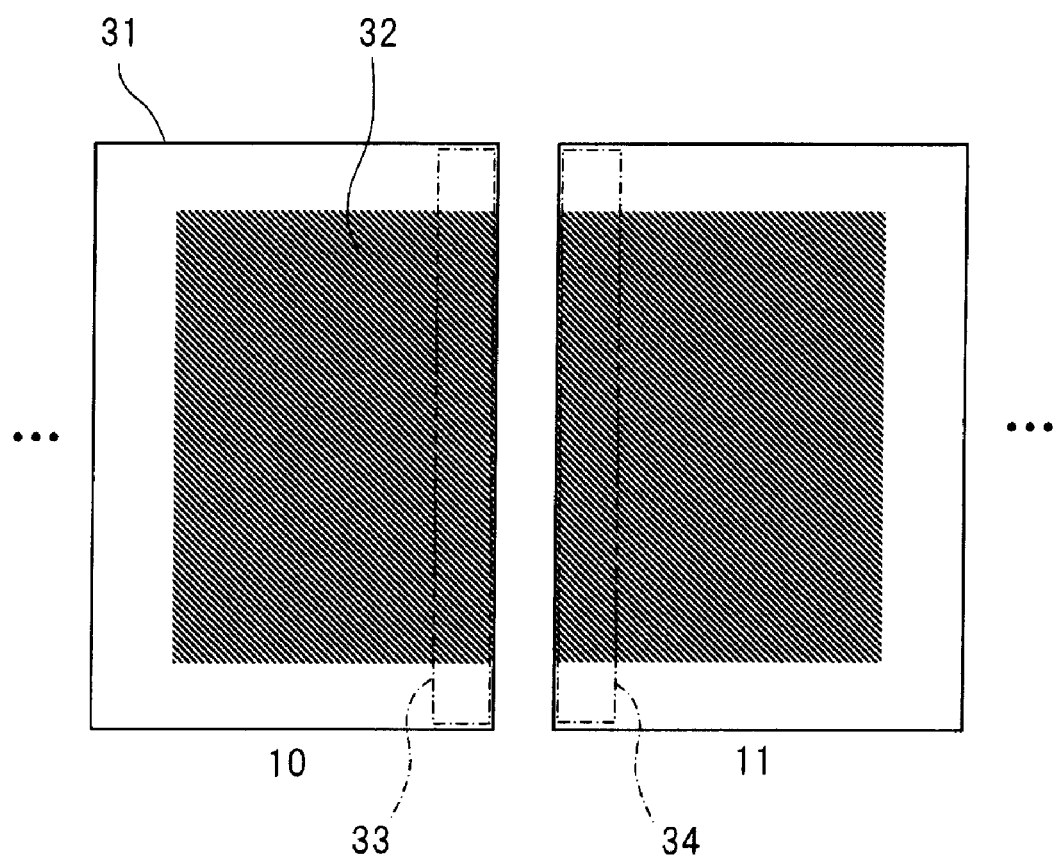
FIG. 7 shows an example of a first area and a second area on a page image.

The first area will be described. FIG. 7 is a drawing for explaining the first area. FIG. 7 shows the page image data 31 corresponding to the pages 10 and 11 of the document A in FIG. 6. A first area 33 is an area corresponding to the right end (first end) of the page image indicated by the page image data 31. In this exemplary embodiment, the first area 33 is an area having a predetermined width (for example, 5 mm) from the side in the right end of the rectangular page image.

Specifically, the page detection section 22 (for example, the first detection unit) determines as to whether or not "i" is an even number and whether or not some image is drawn in the first area 33 of the page image indicated by the i-th piece of page image data 31 (S104). In this step, the page image data 31 having the even-numbered rank and having some image drawn in the first area 33 thereof is detected. Whether or not i is an even number may not be determined at step S104 but may be determined at step S122 in FIG. 4A which will be described later. If the page detection section 22 determines that i is an even number and that an image is drawn in the first area 33, the rank of the page image data 31 (the current value of i) and information indicating that an image is drawn in the first area 33 are stored in the storage section 12 in association with each other (S106).

On the other hand, if the page detection section 22 determines that i is not an even number or if the page detection section 22 determines that an image is not drawn in the first area 33, the page detection section 22 (for example, a second detection unit) determines as to whether or not some image is drawn in a second area 34 of the page image indicated by the i-th piece of page image data 31.

Here, the second area 34 will be described with reference to FIG. 7. The second area 34 is an area corresponding to the left end (second end), opposed to the right end, of the page image indicated by the page image data 31. In this exemplary embodiment, the second area 34 is an area having a predetermined width (for example, 5 mm) from the side of the left end of the rectangular page image.

Specifically, the page detection section 22 (for example, the second detection unit) determines as to whether or not i is an odd number and whether or not some image is drawn in the second area 34 of the page image indicated by the i-th piece of page image data 31 (S105). In this step, the page image data 31 having the odd-numbered rank and having an image drawn in the second area 34 is detected. Whether or not i is an odd number may not be determined at step S105, but may be determined at step S122 in FIG. 4A which will be described later. If the page detection section 22 determines that i is an odd number and that an image is drawn in the second area 34, the rank of the page image data 31 (the current value of i) and information indicating that an image is drawn in the second area 34 are stored in the storage section 12 in association with each other (S106).

By the way, in a document provided by stacking and half-folding sheets, an image may be drawn across two pages printed on the same side of the same sheet. For example, a double spread image may be drawn across two pages at the center of the document as in the (2×s)-th page and (2×s+1)-th page shown in FIG. 5. For example, an image may be drawn across the first page (front cover) and the last page (back cover) as in the first page and (4×s)-th page shown in FIG. 5. By executing the steps S104 to S106, the pieces of page image data 31 corresponding to the pages as mentioned above are detected.

In this exemplary embodiment, each of the first area 33 and the second area 34 is set to be an area having a predetermined width from the side of either end of the page image indicated by the page image data 31. However, the first and second areas 33, 34 are not limited thereto. For example, if an area in which positioning information for a printing time is drawn is located in the lower half of the center of a sheet of a right-side bound document, the first area 33 may be set to be an area, which has a predetermined width from the side at the right end of a page image and which is in the upper-half area of the page image, and the second area 34 may be set to be an area, which has a predetermined width from the side at the left end of a page image and which is in the upper-half area of the page image.

For example, if the opening direction of a document is an upward direction, the first area 33 is set to be an area corresponding to the lower end (for example, first end) of a page image, and the second area 34 is set to be an area corresponding to the lower end (for example, second end) opposed to the upper end, of the page image. Thus, the first area 33 is set to be an area corresponding to the opposite end to the end corresponding to the opening direction of the document, and the second area 34 is set to be an area corresponding to the end corresponding to the opening direction.

After execution of S106, the page detection section 22 determines as to whether or not the steps S103 to S106 have been executed on all the page image data 31 (S107). If it is determined at step S105 that i is not an odd number or that an image is not drawn in the second area 34, the step S107 is also executed. If the steps S103 to S106 have not been executed on all the page image data 31, i is incremented by one (S108), and S103 and the later steps are executed again.

On the other hand, if the steps S103 to S106 have been executed on all the page image data 31, a page image data group for which the later processing is to be performed (which will be hereinafter referred to as "process target page image data") is set (S121). Here, all the page image data 31 contained in the document data is set to the process target page image data. In this case, an order of the process target page image data is set to be the same as the order of the page image data 31 in the document data. Information relating to the process target page image data is stored in the storage section 12.

The page detection section 22 (for example, a determination unit) determines as to whether or not a rank of the piece of the page image data 31 detected at S104 and a rank of the page image data 31 detected at S105 have a predetermined relationship therebetween. Further, if the rank of the page image data 31 detected at S104 and the rank of the page image data 31 detected at S105 have the predetermined relationship therebetween, the page detection section 22 detects that the two pieces of the page image data 31 are page image data 31 corresponding to pages to be printed on the same side of the same sheet in an individual document. Hereinafter, the pieces of page image data 31 detected at S104 and S105 will be referred to as "detected page image data."

Figure 8:
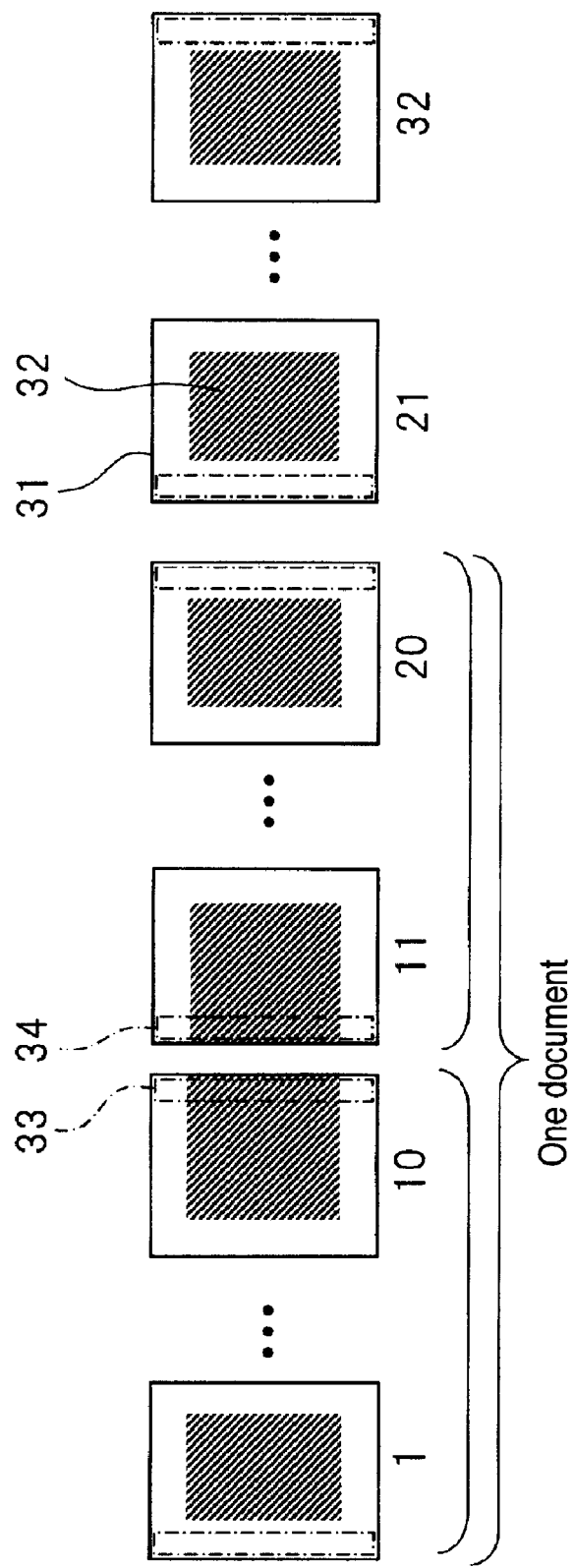
FIG. 8 shows an example of document data from which page image data corresponding to center pages of a document are detected.
Figure 9:
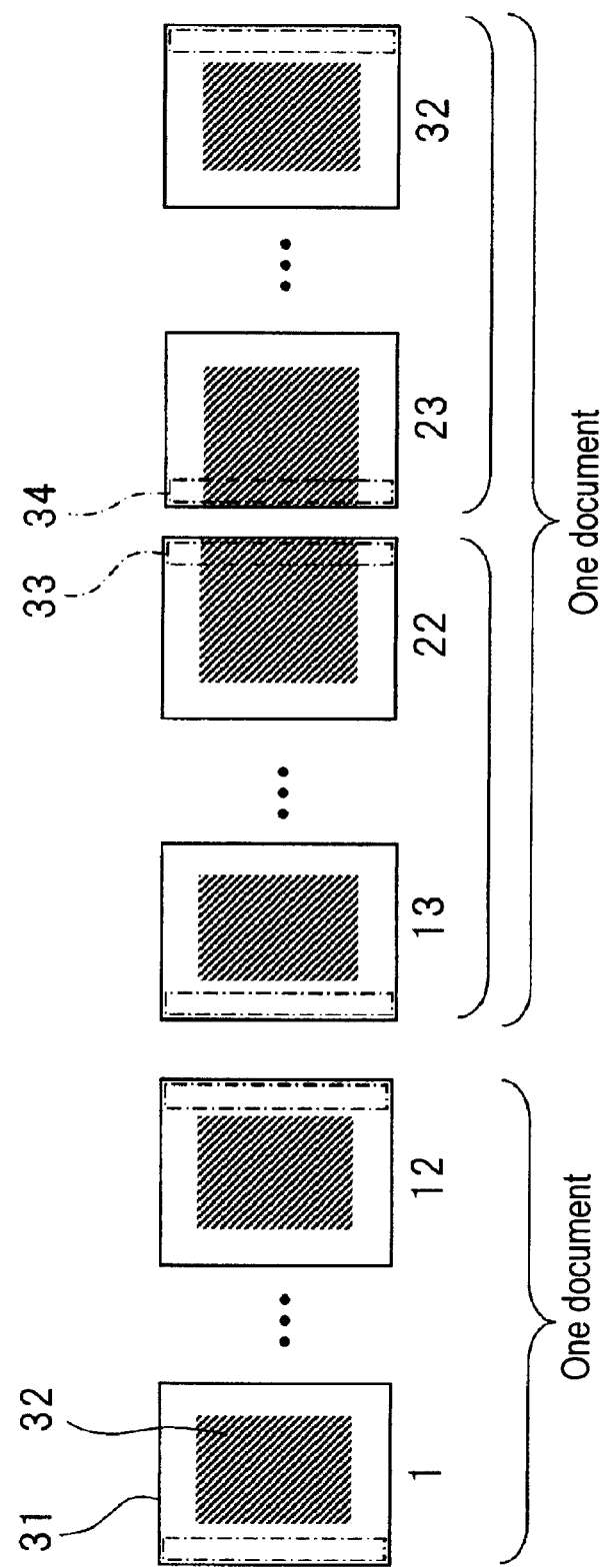
FIG. 9 shows an example of document data from which page image data corresponding to center pages of a document are detected.
Figure 10:
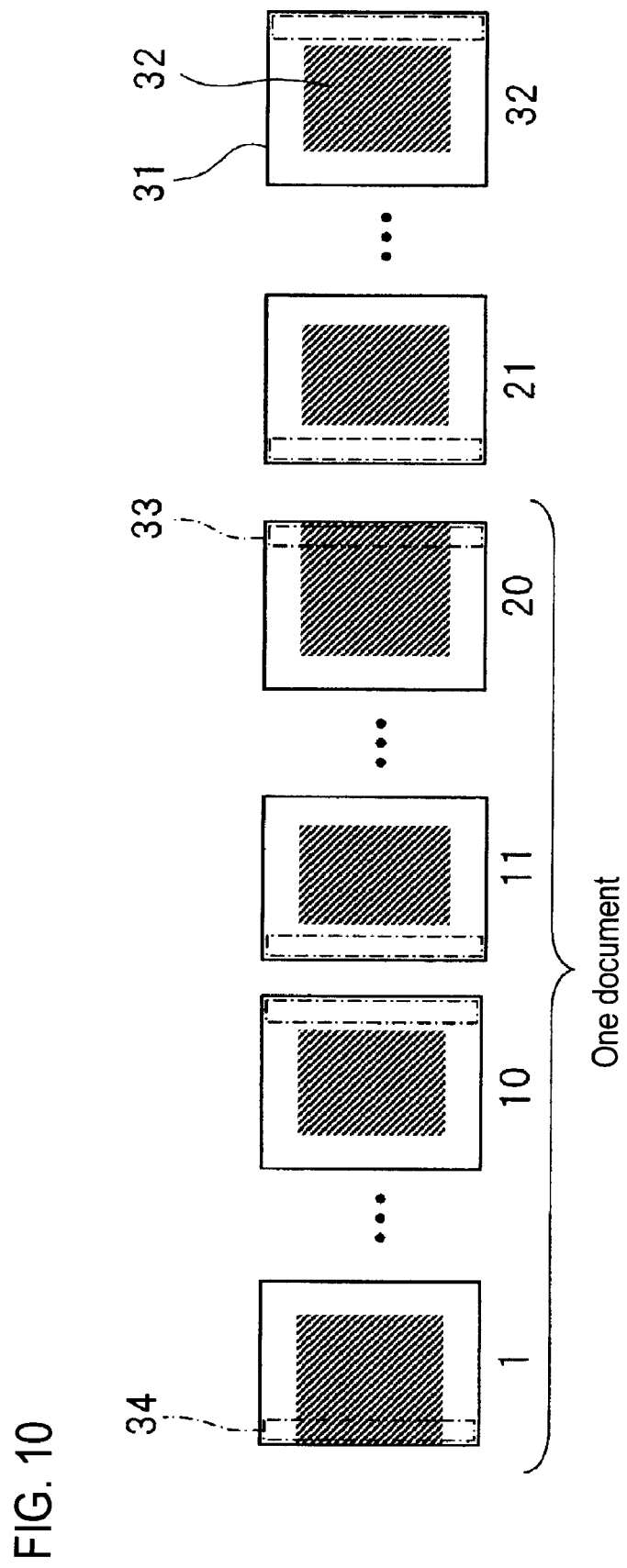
FIG. 10 is shows an example of document data from which page image data corresponding to cover pages of a document are detected.

Specifically, the page detection section 22 executes processes described below. FIGS. 8 to 10 are drawings to describe processes executed by the page detection section 22 and show examples of document data. In the document data shown in FIG. 8, an image (for example, double spread image) is drawn across the page corresponding to the tenth page image data 31 and the page corresponding to the 11th page image data 31. That is, an image is drawn in the first area 33 in the tenth page image data 31, and an image is drawn in the second area 34 in the 11th page image data 31. In the document data shown in FIG. 9, an image (for example, double spread image) is drawn across the page corresponding to the 22nd page image data 31, and the page corresponding to the 23rd page image data 31. In the document data shown in FIG. 10, an image is drawn across the page corresponding to the first page image data 31 and the page corresponding to the 20th page image data 31. That is, an image is drawn in the second area 34 in the first page image data 31, and an image is drawn in the first area 33 in the 20th page image data 31.

The page detection section 22 (for example, the determination unit) determines as to whether or not a pair of detected page image data corresponding to two pages at the center of an individual document exists in the process target page image data. For example, the page detection section 22 determines as to whether or not there is a pair such as (i) a pair of the tenth and 11th page image data 31 in the document data shown in FIG. 8 or (ii) a pair of the 22nd and 23rd page image data 31 in the document data shown in FIG. 9. Specifically, the page detection section 22 determines as to whether or not the process target page image data contain a pair of detected page image data, which are consecutive in rank and one of which having a lower rank is the page image data 31 detected at S104.

The page detection section 22 (for example, the determination unit) determines as to whether or not the process target page image data contains a pair of detected page image data corresponding to the first and final pages of the individual document. For example, the page detection section 22 determines as to whether or not there is a pair such as a pair of the first and 20th page image data 31 in the document data shown in FIG. 10. Specifically, the page detection section 22 determines as to whether or not the process target page image data contain a pair of detected page image data one of which has a rank being 4×1−3 (where 1 is an integer of 1 or more) and the order of which has a rank being 4×k (where k is an integer of 1 or more).

For example, the page detection section 22 (for example, the determination unit) determines as to whether or not the process target page image data contains a pair of the page image data 31, one of which is j-th page image data 31 (j: even number) being detected page image data and the other of which is the next (j+1)-th) page image data 31 also being detected page image data (S122). In this case, the page detection section 22 reads the page image data of the process target page image data in order from its top, and makes a search for a pair of page image data 31 as described above. When the page detection 22 finds a pair of page image data 31 as described above, the search is terminated.

On the other hand, if the page detection section 22 (for example, the determination unit) determines that there is no pair of page image data 31 as described above, the page detection section 22 determines as to whether or not the page image data 31 having the highest rank (that is, its rank is equal to 1) is detected page image data (S126). If the page image data 31 having the highest rank is detected page image data, the page detection section 22 (for example, the determination unit) determines as to whether or not the process target page image data contains the page image data 31, which is the detected page image data and which has a rank being equal to 4×k (where k is an integer of 1 or more) (S127).

If it is determined at S126 or S127 that there is no page image data 31 described above, the page detection section 22 determines that there is no pair of page image data 31 corresponding to the pages to be printed on the same side of the same sheet.

The document specifying section 23 is implemented mainly by the CPU 11 and the storage section 12. The document specifying section 23 specifies page image data 31 corresponding to respective pages of at least one of the documents contained in the document data based on the document data and the detection result of the page detection section 22, and stores such page image data in the storage section 12.

If the rank relationship between the page image data 31 detected at S104 and the page image data 31 detected at S105 falls under the center pages of an individual document, the document specifying section 23 determines that the pair of page image data 31 is the page image data 31 corresponding to the center pages of the individual document, and specifies page image data 31 corresponding to respective pages of one document. Here, the number of the individual documents contained in the document data is defined as n, a rank of the page image data 31 corresponding to the top page of the q-th document in the document data is defined as BS(q), and a rank of the page image data 31 corresponding to the last page in the document data is defined as BE(q). In this case, if the rank of the page image data 31 detected at S104 is the (BS(q)+(BE(q)−BS(q)+1)/2)-th and the rank of the page image data 31 detected at S105 is the (BS(q)+(BE(q)−BS(q)+1)/2+1)-th, it is determined that the pair of page image data 31 is the page image data 31 corresponding to the center pages of the document. The page image data 31 next to the page image data 31 corresponding to the last page of the q-th document is the page image data 31 corresponding to the first page of the (q+1)-th document. The top page of the first document corresponds to the top page image data 31 of the document data, and the last page of the n-th document corresponds to the last page image data 31 of the document data.

Specifically, if it is determined at S122 that there is a pair of page image data 31 satisfying the condition described in S122, the document specifying section 23 determines as to whether or not j is equal to or less than a half of the number of the process target page image data (N) (S123). If j is equal to or less than the number of the process target page image data (N), the document specifying section 23 determines that the first page image data 31 in the process target page image data is the page image data 31 corresponding to the first page of the document, and specify the first to (2×j)-th page image data 31 in the process target page image data as the page image data 31 corresponding to the respective pages of one document (S124). For example, for the document data shown in FIG. 8, a pair of the tenth and 11th page image data 31 is detected at S122. At S123, it is determined that j (10) is equal to or less than the number of the process target page image data (32). At S124, the first to 20th page image data 31 are specified as the page image data 31 corresponding to the respective pages of one document.

On the other hand, if it is not determined that j is equal to or less than a half of the number of the process target page image data (N), the document specifying section 23 determines that the last page image data 31 in the process target page image data corresponds to the page image data 31 corresponding to the last page of one document. In this case, the document specifying section 23 determines that the (2×j−N+1)-th to N-th page image data 31 in the process target page image data are the page image data of one document. Further, the document specifying section 23 determines that the remaining page image data 31, namely, the first to (2×j−N)-th page image data 31 are the page image data of another document. However, in this process, only the latter is specified. The former is specified in the next loop.

That is, if it is not determined at S123 that j is equal to or less than a half of the number of the process target page image data (N), the document specifying section 23 specifies the first to (2×j−N)-th page image data 31 in the process target page image data as the page image data 31 corresponding to the respective pages of one document (S125). For example, for the document data shown in FIG. 9, a pair of the 22nd and 23rd page image data 31 is detected at S122. At S123, it is not determined that j (22) is equal to or less than a half of the number of the process target page image data (32). At S125, the first to 12th pieces of the page image data 31 are specified as the page image data 31 corresponding to the respective pages of one document.

If the rank relationship between the page image data 31 detected at S104 and the page image data 31 detected at S105 falls under the front cover and back cover pages of an individual document, the document specifying section 23 determines that the pair of the page image data 31 is the page image data 31 corresponding to two pages of both ends of an individual document, and then specifies the page image data 31 corresponding to the respective pages of one individual document.

Specifically, if it is determined at S127 that there is the detected page image data satisfying the condition described in S127, the document specifying section 23 determines specifies the first to (4×k)-th page image data 31 as the page image data of one document (S128). For example, for the document data shown in FIG. 10, it is determined at S126 that the first page image data in the process target page image data is detected page image data. At S127, the 20th page image data in the process target page image data is found. At S128, the first to 20th page image data 31 in the process target page image data are specified as the page image data 31 corresponding to the respective pages of one document.

If it is determined at S126 or S127 that there is no page image data satisfying the condition described in S126 or S127, the document specifying section 23 specifies all the process target page image data as the page image data of one document (S129).

After the execution of the step S124, S125, S128, or S129, the document specifying section 23 stores the page image data 31, which are specified as the page image data 31 of one document at S124, S125, S128, or S129, into the storage section 12 (S130). The specified page image data 31 are removed from the process target page image data, and ranks are again assigned to the process target page image data with starting at 1 (S131). For example, new top page image data 31 is set as first page image data 31.

Then, the document specifying section 23 determines as to whether or not the number of the process target page image data (N) becomes equal to 0 (S132). If the number of the process target page image data (N) is not equal to 0, the page detection section 22 again executes the processing starting at S122. The steps S122 to S132 are repeated, whereby the page image data 31 corresponding to the respective pages of each document is specified.

According to the page detection section 22 and the document specifying section 23 described above, the page image data 31 of the center pages of each document or the page image data 31 of the page of the front cover (back cover) of each document is detected, and the page image data 31 corresponding to the respective pages of one document are specified. Not only the page image data 31 of the center pages of each document or the page image data 31 of the page of the front cover (back cover) of each document, but also the page image data 31 of another page to be printed on the same side of the same sheet may be detected. For example, if there is a pair of detected page image data, one of which has a rank being 4×1−2 (where l is an integer of 1 or more) and the other of which ahs a rank being 4×k−1 (where k is an integer of 1 or more), in the process target page image data, it may be detected that those page image data 31 are the page image data 31 of the pages to be printed on the same side of the same sheet. Then, it may be determined that a pair of page image data 31 at the middle of the page image data 31, namely, a pair of (2×k+2×l−2)-th and (2×k+2×l−1)-th page image data 31 is the page image data 31 corresponding to the center pages of an individual document, and the page image data 31 of one document may be specified.

The document output section 24 is implemented mainly by the CPU 11, the storage section 12, the display section 13, the communication section 14, and the printer 15. The document output section 24 acquires the specifying result of the document specifying section 23 from the storage section 12, and outputs data based on the specifying result to the display section 13, the communication section 14, or the printer 15 (S133). The data is output to the display section 13, for example, for allowing the user to view or read the data. The data is output to the communication section 14, for example, for transferring the data to an external computer connected through a network or printing the data from a printer connected to the network. The data is output to the printer 15, for example, for printing the data.

For example, the document output section 24 acquires the page image data 31 of two or more individual documents specified by the document specifying section 23, and outputs the page image data 31 corresponding to the respective pages of each individual document. That is, for individual document, the document output section 24 executes a process of acquiring the page image data 31 of each individual document specified by executing the steps S122 to S132 from the storage section 12 and outputting the page image data to any of the display section 13, the communication section 14, or the printer 15. In this case, for individual documents, the page image data are output separately.

For example, for at least two of the individual documents, the document output section 24 may generate sheet image data corresponding to each side of each sheet of the individual documents based on the page image data 31 corresponding to the pages of the individual documents and may output the sheet image data.

In this case, the relationship between respective sides of respective sheets of the individual documents and the page numbers is the same as that previously described with reference to FIG. 5. The document output section 24 assigns pages to respective sides of respective sheets of a certain individual document so as to satisfy the relationship described above, and generates sheet image data representing images of the result of assigning the page image data 31 corresponding to the pages. The document output section 24 also performs this process for other individual documents, and collectively outputs a series of sheet image data for the plural individual documents. In this case, letting the total number of the sheets of the individual documents be s (see FIG. 5), the order of the sheet image data is set, for example, as the sheet image data of the inner side of the s-th sheet, the sheet image data of the outer side of the s-th sheet, the sheet image data of the inner side of the (s−1)-th sheet, the sheet image data of the outer side of the (s−1)-th sheet, . . . , the sheet image data of the inner side of the first sheet, the sheet image data of the outer side of the first sheet.

Figure 11:
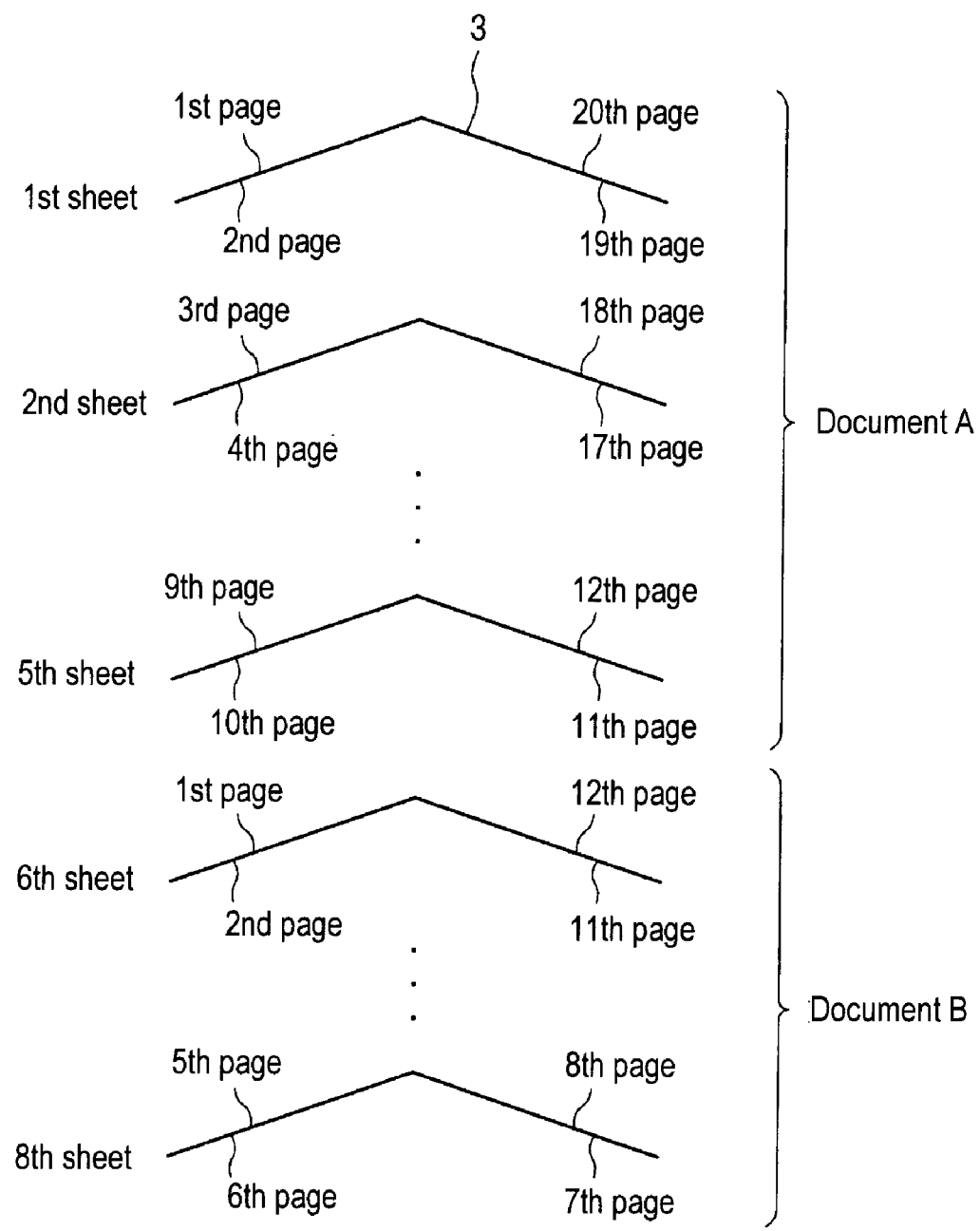
FIG. 11 shows an example of sheets which is obtained by printing, on a printer, data output by the document processing apparatus.

FIG. 11 shows an example of sheets printed on the printer 15 based on the sheet image data output by the document output section 24. FIG. 11 shows an example in which individual documents include a document A (20 pages in total) and a document B (12 pages in total). The page numbers in the figure are page numbers of each individual document, and the respective individual documents are printed on separate sheets. In the example shown in the figure, each printed sheet is half folded. That is, in this case, the sheet image data corresponding to the respective sides of the respective sheets of at least two individual documents are output. As a result, for example, the individual documents are printed out with the premise that a general both-sided print function is used and that each sheet is half folded.

For example, the document output section 24 (for example, a generation unit) may generate output document data containing the page image data 31 corresponding to the respective pages of the first to n-th documents specified by the document specifying section 23 and may output the output document data.

In the output document data, the order of the page image data 31 corresponding to the respective pages of the first to n-th documents is set so that the page image data 31 next to the page image data 31 corresponding to the last page of the first half of the (m−1)-th document (where m is an integer of 2≦m≦n) becomes the page image data 31 corresponding to the first page of the m-th document and that the page image data 31 next to the page image data 31 corresponding to the last page of the m-th document becomes the page image data 31 corresponding to the first page of the latter half of the (m−1)-th document. That is, the order of the page image data 31 corresponding to the respective pages of the first to n-th documents is set so that the m-th document is inserted between the two pages in the center of the (m−1)-th document.

FIG. 12 is a drawing to show an example of the order of the page image data 31 in the output document data and the sides of sheets on which the page image data 31 is printed. FIG. 12 shows an example in which the output document data contains the page image data 31 corresponding to the respective pages of the document A (20 pages in total) and the document B (12 pages in total) (n=2). As shown in the figure, the first page image data 31 in the output document data corresponds to the first page of the document A. The second to tenth page image data 31 in the output document data correspond to the second to tenth pages of the document A, respectively. Further, the 11th to 22nd page image data 31 in the output document data correspond to the first to 12th pages of the document B, respectively. The 23rd to 32nd page image data 31 in the output document data correspond to the 11th to 20th pages of the document A, respectively. If the output document data is printed so that each output document becomes a document with the sheets being stacked and half folded, that is, if the output document data is printed so that the pages (page image data 31) in the output document data and the respective sides of the respective sheets have the relationship previously described with reference to FIG. 5, the documents A and B are printed collectively and are printed on separate sheets. That is, in this case, the documents A and B are printed so that one document B is inserted into the inner side of the other document A when the sheets are stacked and half folded (see FIG. 11).

In the document processing apparatus 1 according to the first exemplary embodiment described above, for each document obtained by stacking and half folding sheets, the page image data corresponding to the pages to be printed on the same side of the same sheet are detected from the document data containing the page image data of two or more documents. In a document obtained by stacking and half folding sheets, for example, one image may be drawn across two pages, which are printed on the same side of the same sheet. For example, one image (for example, a double spread image) may be drawn across two pages at the center of the document or one image may be drawn across the first page and the last page (front cover and back cover) of the document. In the first exemplary embodiment, the page image data corresponding to such pages are detected, and consequently the page image data corresponding to the pages to be printed on the same side of the same sheet are detected. In the document obtained by stacking and half folding sheets, for example, one image being drawn across two pages not printed on the same side of the same sheet may be detected. In the first exemplary embodiment, it is not detected that the page image data corresponding to such pages are the page image data corresponding to the pages printed on the same side of the same sheet. In the document processing apparatus 1, the page image data of each document is specified based on the detection result described above, and data based on the page image data of each document is output. Even if information indicating separation of the documents is not contained, the document processing apparatus 1 can specify the page image data of each document. The document processing apparatus 1 can save time and labor of a person who wants to specify the page image data of each document (the person who wants to output the data based on the page image data of each document).

Second Exemplary Embodiment

A configuration example of a document processing apparatus 1 according to a second exemplary embodiment of the invention is the same as that of the document processing apparatus 1 according to the first exemplary embodiment (see FIG. 1) and therefore, will not be described again.

Figure 13A:
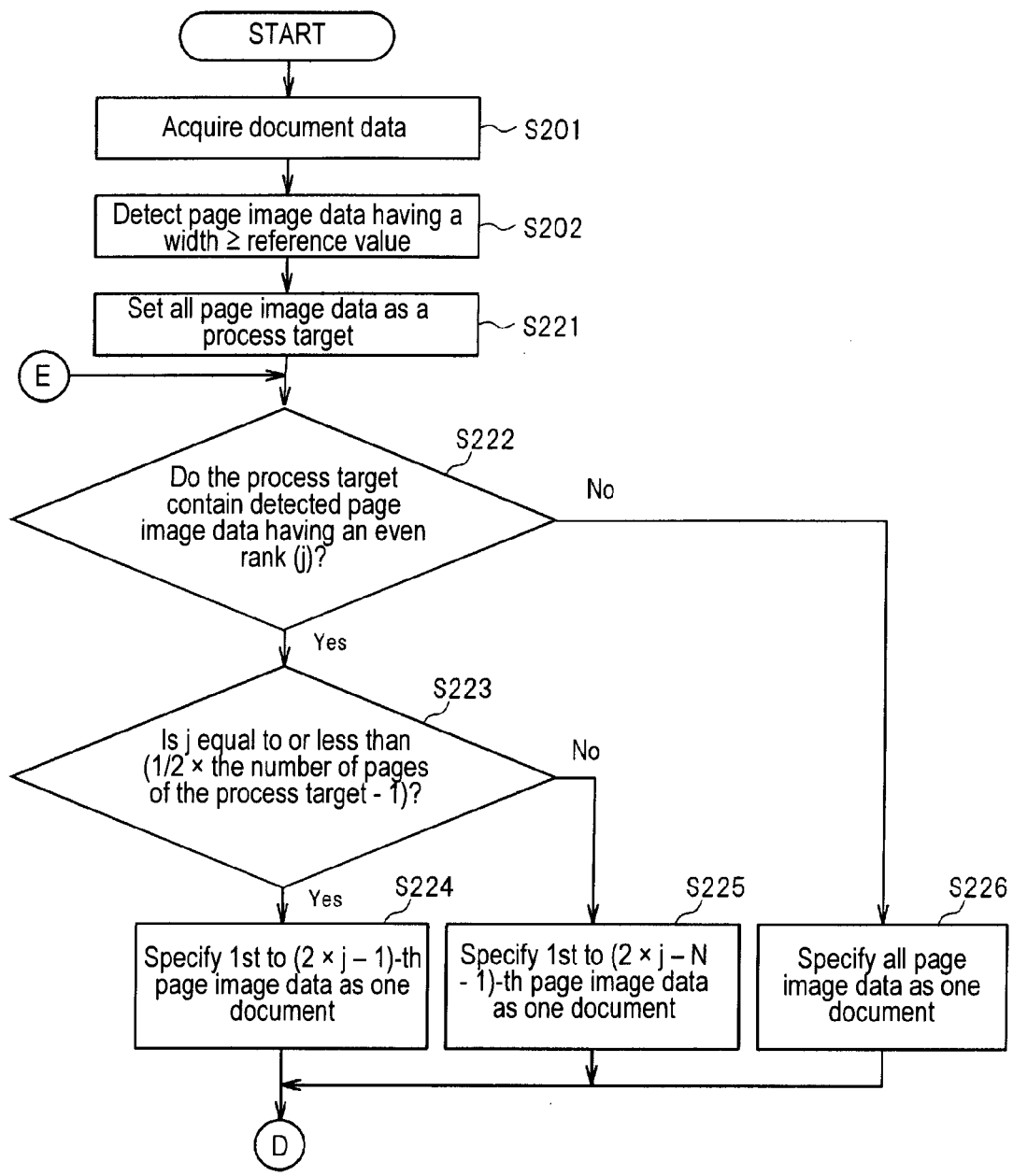
FIGS. 13A and 13B are flowcharts showing an example of a process flow of a document processing apparatus according to a second exemplary embodiment of the invention.
Figure 13B:
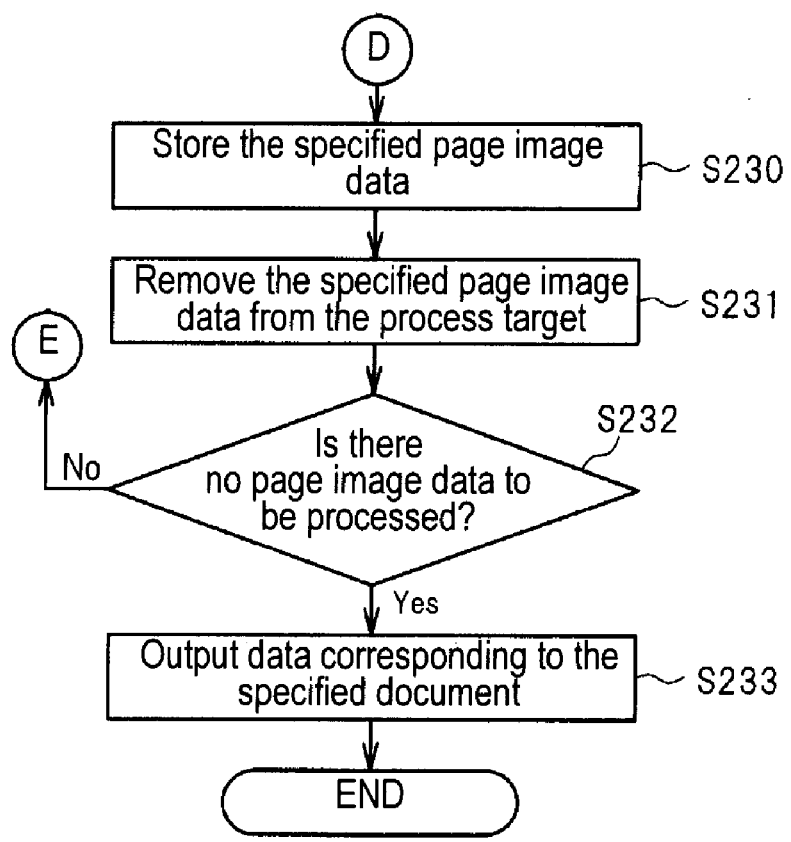

The functions provided by the document processing apparatus 1 are represented by the functional block diagram of FIG. 2 as in the first exemplary embodiment. There are differences in the details of the functional blocks between the second exemplary embodiment and the first exemplary embodiment. Therefore, the second exemplary embodiment will be described with mainly focusing on the differences therebetween. FIGS. 13A and 13B are flowcharts to show an example of a process flow of the document processing apparatus 1 according to the second exemplary embodiment of the invention. The operation of the respective functional blocks will be described with reference to FIGS. 13A and 13B.

The acquisition section 21 is implemented mainly by the CPU 11, the storage section 12, and the communication section 14. The acquisition section 21 acquires document data (S201). This step is similar to S101 in the first exemplary embodiment (see FIG. 3).

Figure 14:
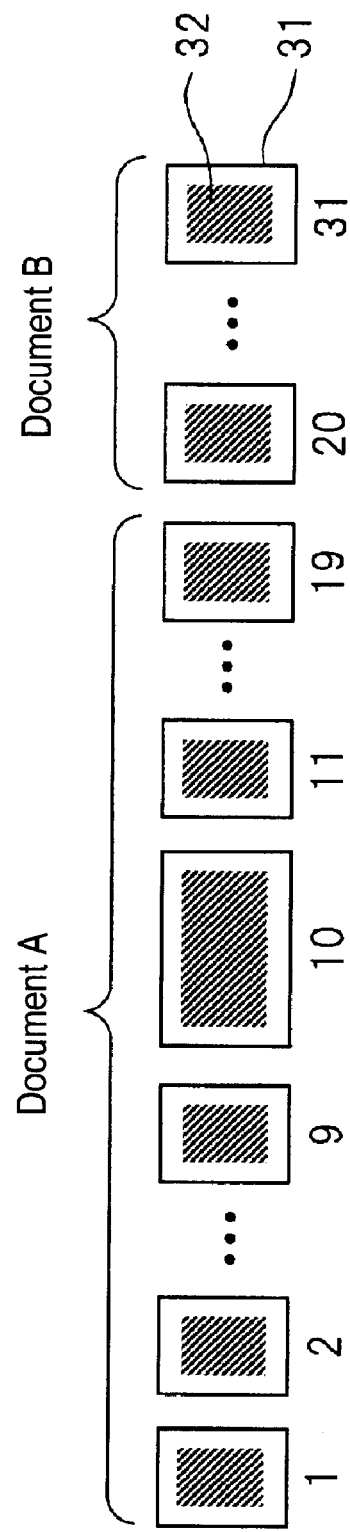
FIG. 14 shows an example of contents of document data containing page image data of plural documents, according to the second exemplary embodiment of the invention.

FIG. 14 shows an example of contents of document data according to the second exemplary embodiment. This document data is configured so that page image data 31 of plural individual documents (document A and document B) can be read out in order. The sizes of a page images indicated by the page image data 31 vary from one page to another page. In the example shown in FIG. 14, the page image indicated by the tenth page image data 31 is larger than any other page image. In this exemplary embodiment, a page image of continuous pages to be printed on the same side of the same sheet may be configured as one piece of page image data 31. In the example shown in FIG. 14, the page image indicated by the tenth page image data 31 corresponds to continuous pages to be printed on the same side of the same sheet in the document A. For example, to draw one image (for example, a double spread image) across two pages at the center of a document, the page images of such pages are brought together to constitute one piece of page image data 31. It is noted that the document data does not contain information indicating separation between the individual documents.

The page detection section 22 is implemented mainly by the CPU 11 and the storage section 12. The page detection section 22 detects the page image data 31 corresponding to pages to be printed on the same side of the same sheet in an individual document based on the sizes of the page images indicated by the page image data 31 contained in the document data acquired by the acquisition section 21. That is, in the second exemplary embodiment, to detect the page image data 31 corresponding to the pages printed on the same side of the same sheet of a document obtained by stacking and half folding sheets, the sizes of the page images indicated by the page image data 31 are used as a detection criterion. The detection result of the page detection section 22 is stored in the storage section 12.

For example, the page detection section 22 detects such page image data 31 that an index value, which represents a size of a page image indicated by the page image data 31, is larger than a reference value (S202). For example, a width of a page image (horizontal length) is used as the index value indicating the size of the page image. In addition, a height of the page image (vertical length) or an area of the page image may be used as an index value. The reference value may be larger than the index value corresponding to one page and smaller than the index value corresponding to two pages. If the individual document is a right-side or left-side bound document, it is desirable that the width of the page document or the area of the page image be used as the index value. If the individual document is an bottom-side bound document, it is desirable that the height of the page document or the area of the page image be used as the index value. Hereinafter, the page image data 31 detected at S202 will be referred to as "detected page image data."

After the above-described detection is executed for all page image data 31, a group of page image data 31 for which the later processes (S222 to S232) are to be performed (which will be hereinafter referred to as "process target page image data") is set (S221). Specific processes are similar to those in the first exemplary embodiment and will not be described again.

The document specifying section 23 is implemented mainly by the CPU 11 and the storage section 12. The document specifying section 23 acquires document data and the detection result of the page detection section 22 from the storage section 12, and specifies page image data 31 corresponding to pages of at least one of the documents from the page image data 31 contained in the document data, based on the detection result. The specifying result of the document specifying section 23 is stored in the storage section 12.

Figure 15:
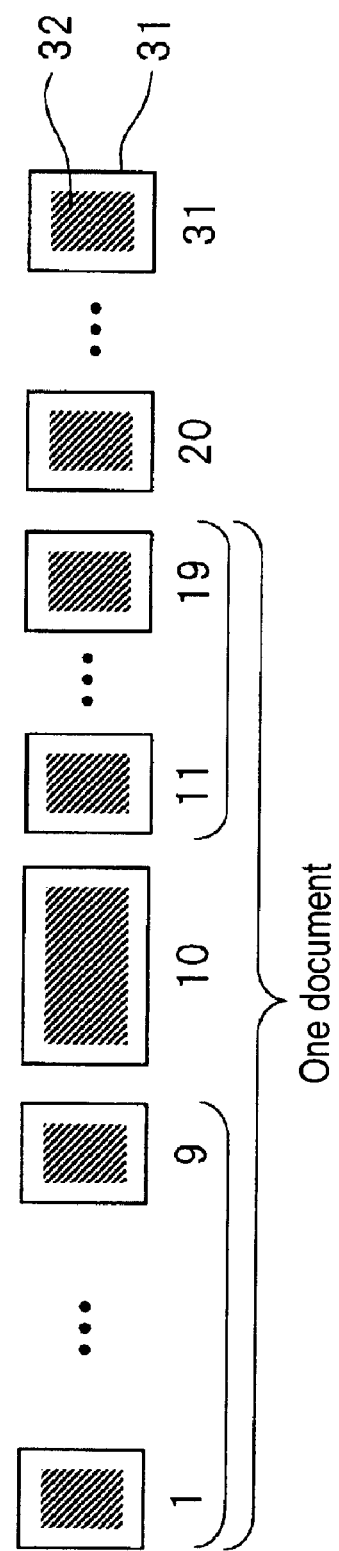
FIG. 15 shows an example in which page image data corresponding to pages printed on the same side of the same sheet is detected.
Figure 16:
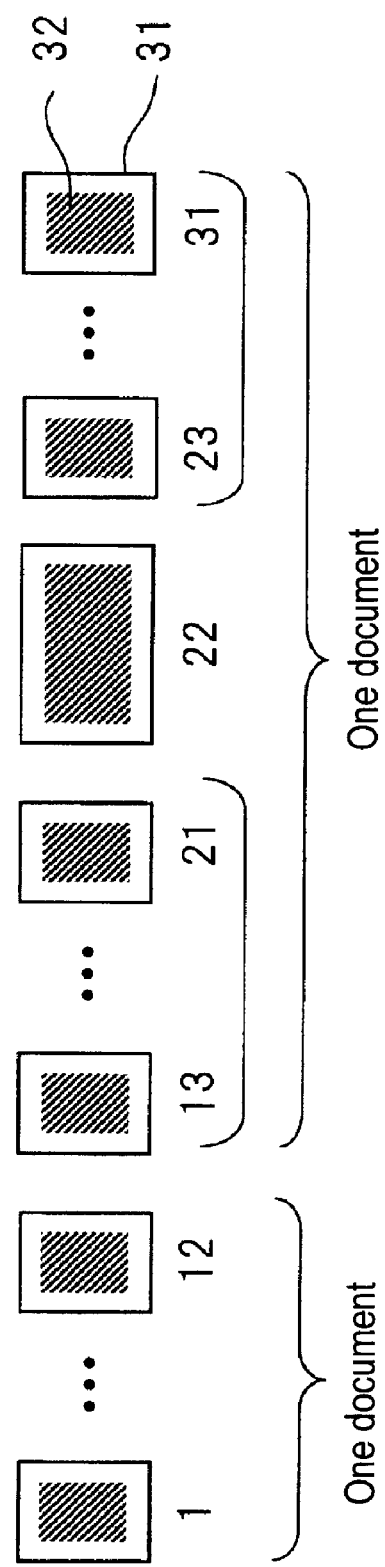
FIG. 16 shows an example in which page image data corresponding to pages printed on the same side of the same sheet is detected.

FIGS. 15 and 16 are drawings to describe processes of the document specifying section 23. FIGS. 15 and 16 show examples of the document data. In the document data shown in FIG. 15, the size (width) of the page image indicated by the tenth page image data 31 is larger than that of any other page image. In the document data shown in FIG. 16, the size (width) of the page image indicated by the 22nd page image data 31 is larger than that of any other page image.

The document specifying section 23 determines that the page image data 31, which is determined as corresponding to the index value larger than the reference value at S202, is page image data 31 corresponding to the center pages of an individual document, and specifies page image data 31 corresponding to the pages of one document. Here, the number of documents contained in the document data is defined as n, a rank of the top page of the q-th document in the document data is defined as BS(q), and a rank of the last page in the document data is defined as BE(q). In this case, if the page image data 31 determined as corresponding to the index value larger than the reference value at S202 is the page image data 31 corresponding to the two pages at the center of the document, that is, the (BS(q)+(BE(q)−BS(q)+1)/2)-th page image data 31, it is determined that such page image data 31 is the page image data 31 corresponding to the center pages of the document.

For example, the document specifying section 23 determines as to whether or not the process target image data contains detected page image data having an even rank (S222). For example, In the case of the document data shown in FIG. 15, the tenth page image data 31 is found at this step. For example, in the case of the document data shown in FIG. 16, the 22nd page image data 31 is found at the step. If the document specifying section 23 determines that there is detected page image data having an even rank, the document specifying section 23 determines as to whether or not the rank (j) of the page image data 31 is equal to or less than ((N/2)−1) (S223), where N indicates the number of process target page image data. For example, if the value of j (10) is equal to or less than ((N/2)−1) as in the document data shown in FIG. 15, the document specifying section 23 determines that the first page image data 31 in the process target page image data corresponds to the first page of the document, and specifies the first to (2×j−1)-th page image data 31 in the process target page image data as page image data 31 of one document (S224). For example, if the value of j (22) is greater than ((N/2)−1) as in the document data shown in FIG. 16, the document specifying section 23 determines that the last page image data 31 in the process target page image data corresponds to the last page of the document. In this case, the document specifying section 23 specifies the (2×j−N)-th to Nth page image data 31 in the process target page image data as page image data of one document. Further, the document specifying section 23 specifies the remaining page image data 31 as page image data of another document. However, only the latter is specified in this process. That is, the document specifying section 23 specifies the first to (2×j−N−1)-th page image data 31 in the process target page image data as page image data 31 of one document (S225). In the next loop, the (2×j−N)-th to Nth page image data 31 are specified as page image data 31 of one document.

If it is determined at S222 that there is no detected page image data having an even rank, the document specifying section 23 specifies all the process target page image data as page image data 31 of one document (S226).

After execution of the step S224, S225, or S226, the document specifying section 23 stores the page image data 31 specified at S224, S225, or S226 in the storage section 12 (S230). The specified page image data 31 is removed from the process target page image data, and ranks are again assigned to the process target page image data with starting at 1 (S231). For example, the new top page image data 31 is set as the first page image data 31.

Then, the document specifying section 23 determines as to whether or not the number of process target page image data (N) becomes equal to 0 (S232). If the number of process target page image data (N) is not equal to 0, the page detection section 22 executes the processes from at S222 again. Accordingly, the page image data 31 corresponding to the pages of each document is specified.

The document output section 24 is implemented mainly by the CPU 11, the storage section 12, the display section 13, the communication section 14, and the printer 15. The document output section 24 acquires the specifying result of the document specifying section 23 from the storage section 12, and outputs data based on the specifying result to the display section 13, the communication section 14, or the printer 15 (S233). The operation of the document output section 24 is similar to that in the first exemplary embodiment. For example, the document output section 24 outputs the page image data corresponding to the pages of the document determined by executing the steps S222 to S226 and S230 to S232.

Also, in the document processing apparatus 1 according to the second exemplary embodiment described above, for each document obtained by stacking and half folding sheets, the page image data corresponding to the pages to be printed on the same side of the same sheet is detected from the document data containing the page image data of two or more documents. In the document data of a document obtained by stacking and half folding sheets, for example, to draw one image across two pages printed on the same side of the same sheet, the two pages may be collected into one page image data. In the second exemplary embodiment, such page image data is detected and consequently, the page image data corresponding to the pages printed on the same side of the same sheet is detected. The page image data of each document is specified based on the detection result, and the data based on the page image data of each document is output. Also, in the second exemplary embodiment, even if information indicating separation between the documents is not contained, the page image data of each document is specified. The document processing apparatus 1 of the second exemplary embodiment can also save time and labor of a person who wants to specify the page image data of each document (the person who wants to output data based on the page image data of each document).

What is claimed is:

1. A document processing apparatus comprising:
    an acquisition unit that acquires document data containing plural pieces of page image data corresponding to respective pages of a plurality of documents, each document being formed by stacking and half-folding sheets;
    a detection unit that detects, based on characteristics of the plural pieces of page image data, pieces of page image data corresponding to pages to be printed on a same side of a same sheet in the documents, from the plural pieces of page image data contained in the document data;
    a specifying unit that specifies, based on positions of the detected pieces of page image data in the document data, pieces of page image data corresponding to respective pages of each document, from the plural pieces of page image data contained in the document data; and
    an output unit that outputs data, which is based on pieces of page image data corresponding to respective pages of at least one of the documents, based on a specifying result of the specifying unit,
    wherein the detection unit includes
    a first detection unit that detects page image data having an image drawn in a first area corresponding to a first end, and
    a second detection unit that detects page image data having an image drawn in a second area corresponding to a second end opposed to the first end, and
    the detection unit detects the pieces of page image data corresponding to the pages to be printed on the same side of the same sheet in the documents, based on a detection result of the first detection unit and a detection result of the second detection unit.

2. The document processing apparatus according to claim 1, wherein the document data is configured so that the plural pieces of page image data corresponding to the respective pages of the plurality of documents can be read out in a predetermined order,
    the detection unit further includes
    a determination unit that determines as to whether or not a rank of the page image data detected by the first detection unit and a rank of the page image data detected by the second detection unit have a predetermined relationship therebetween, and
    when the determination unit determines that the rank of the page image data detected by the first detection unit and the rank of the page image data detected by the second detection unit have the predetermined relationship, the detection unit detects that the page image data detected by the first detection unit and the page image data detected by the second detection unit are the pieces of page image data corresponding to the pages to be printed on the same side of the same sheet in the documents.

3. The document processing apparatus according to claim 1, wherein the detection unit detects the pieces of page image data corresponding to the pages to be printed on the same side of the same sheet in the documents, based on sizes of the page images indicated by the plural pieces of page image data contained in the document data.

4. The document processing apparatus according to claim 3, wherein the detection unit includes
    a determination unit that determines as to whether or not an index value indicating the size of the page image indicated by each page image data is larger than a reference value, and
    when the determination unit determines that an index value of a certain page image data is larger than the reference value, the detection unit detects that the certain page image data is the pieces of page image data corresponding to the pages to be printed on the same side of the same sheet in the documents.

5. The document processing apparatus according to claim 1, wherein the output unit outputs the page image data corresponding to the pages of the document, for each document.

6. The document processing apparatus according to claim 1, wherein
    the document data is configured so that the plural pieces of page image data corresponding to the respective pages of the plurality of documents can be read out in a predetermined order,
    the specifying unit specifies pieces of page image data corresponding to respective pages of first to n-th documents of the plurality of documents, based on the detection result of the detection unit,
    the output unit includes a generation unit that generates output document data containing the pieces of page image data corresponding to the respective pages of the first to n-th documents,
    the generation unit generates the output document data in which an order of the pieces of page image data corresponding to the respective pages of the first to n-th documents is set so that page image data next to page image data corresponding to a last page of a first half of the (m−1)-th document becomes page image data corresponding to a first page of the m-th document and that page image data next to page image data corresponding to a last page of the m-th document becomes page image data corresponding to a first page of a latter half of the (m−1)-th document,
    m is an integer of $2 \leq m \leq n$, and
    the output unit outputs the output document data.

7. The document processing apparatus according to claim 1, wherein
    the output unit includes a generation unit that generates sheet image data corresponding to respective sides of respective sheets of at least two documents of the plurality of documents, based on the pieces of page image data, which correspond to the respective pages of each documents and which are specified by the specifying unit, and
    the output unit outputs the sheet image data corresponding to the respective sides of the respective sheets of the at least two documents.

8. A document processing method comprising:
acquiring, using a processor, document data containing plural pieces of page image data corresponding to respective pages of a plurality of documents, each document being formed by stacking and half-folding sheets;
a first detection step of detecting, based on characteristics of the plural pieces of page image data, pieces of page image data corresponding to pages to be printed on a same side of a same sheet in the documents, from the plural pieces of page image data contained in the document data;
specifying, based on positions of the detected pieces of page image data in the document data, pieces of page image data corresponding to respective pages of each document, from the plural pieces of page image data contained in the document data;
outputting data, which is based on pieces of page image data corresponding to respective pages of at least one of the documents, based on a result of the specifying;
a second detection step of detecting page image data having an image drawn in a first area corresponding to a first end; and
a third detection step of detecting page image data having an image drawn in a second area corresponding to a second end opposed to the first end,
wherein the first detection step detects the pieces of page image data corresponding to the pages to be printed on the same side of the same sheet in the documents, based on a result of the second detection step and a result of the third detection step.

9. The document processing method according to claim 8, wherein the document data is configured so that the plural pieces of page image data corresponding to the respective pages of the plurality of documents can be read out in a predetermined order,
the document processing method further comprising:
determining as to whether or not a rank of the page image data detected in the second detection step and a rank of the page image data detected in the third detection step have a predetermined relationship therebetween, wherein
when it is determined that the rank of the page image data detected in the second detection step and the rank of the page image data detected in the third detection step have the predetermined relationship, the first detection step detects that the page image data detected in the second detection step and the page image data detected in the third detection step are the pieces of page image data corresponding to the pages to be printed on the same side of the same sheet in the documents.

10. A non-transitory computer-readable medium storing a program that causes a computer to execute document processing, the document processing comprising:
acquiring document data containing plural pieces of page image data corresponding to respective pages of a plurality of documents, each document being formed by stacking and half-folding sheets;
a first detection step of detecting, based on characteristics of the plural pieces of page image data, pieces of page image data corresponding to pages to be printed on a same side of a same sheet in the documents, from the plural pieces of page image data contained in the document data;
specifying, based on positions of the detected pieces of page image data in the document data, pieces of page image data corresponding to respective pages of each document, from the plural pieces of page image data contained in the document data;
outputting data, which is based on pieces of page image data corresponding to respective pages of at least one of the documents, based on a result of the specifying
a second detection step of detecting page image data having an image drawn in a first area corresponding to a first end; and
a third detection step of detecting page image data having an image drawn in a second area corresponding to a second end opposed to the first end,
wherein the first detection step detects the pieces of page image data corresponding to the pages to be printed on the same side of the same sheet in the documents, based on a result of the second detection step and a result of the third detection step.

11. The non-transitory computer-readable medium according to claim 10, wherein the document data is configured so that the plural pieces of page image data corresponding to the respective pages of the plurality of documents can be read out in a predetermined order,
the document processing further comprises determining as to whether or not a rank of the page image data detected in the second detection step and a rank of the page image data detected in the third detection step have a predetermined relationship therebetween, and
when it is determined that the rank of the page image data detected in the second detection step and the rank of the page image data detected in the third detection step have the predetermined relationship, the first detection step detects that the page image data detected in the second detection step and the page image data detected in the third detection step are the pieces of page image data corresponding to the pages to be printed on the same side of the same sheet in the documents.

* * * * *